United States Patent [19]

McCleery

[11] Patent Number: 5,171,152
[45] Date of Patent: Dec. 15, 1992

[54] TRAINING DEVICE FOR BATTERS AND GOLFERS

[76] Inventor: Ray A. McCleery, 9753 Greenwood Rd., Grass Lake, Mich. 49240

[21] Appl. No.: 833,168

[22] Filed: Feb. 10, 1992

[51] Int. Cl.⁵ .............................................. A63B 69/36
[52] U.S. Cl. ................................. 434/252; 273/187.2; 273/187.6; 273/26 C; 2/199; 33/263; 351/155; 434/247
[58] Field of Search .............. 434/247, 252; 273/26 C, 273/32 B, 183 B, 183 E, 190 A; 2/199; 33/263; 351/155

[56] References Cited

U.S. PATENT DOCUMENTS

| | | | |
|---|---|---|---|
| 1,169,188 | 1/1916 | Peck | 273/183 B |
| 3,109,654 | 11/1963 | Comitz | 273/183 B |
| 3,264,002 | 10/1963 | Palumbo | 273/183 B |
| 3,437,339 | 4/1969 | Starck | 273/183 B |
| 3,487,549 | 1/1970 | Engesser | 273/183 B |
| 3,729,199 | 4/1973 | Granberg | 273/183 B |
| 3,826,502 | 7/1974 | Sorge | 33/262 X |
| 4,531,743 | 7/1985 | Lott | 273/183 B |
| 4,696,111 | 9/1987 | Gardner | 273/183 E X |
| 4,762,325 | 8/1988 | McCleery | 273/183 B |

FOREIGN PATENT DOCUMENTS 1373772 11/1974 United Kingdom ............ 273/183 B

Primary Examiner—John G. Weiss
Assistant Examiner—L. Thomas
Attorney, Agent, or Firm—Beaman & Beaman

[57] ABSTRACT

A training device for encouraging proper body characteristics during the striking of a ball, such as a baseball or a golf ball. In particular, the training device encourages immobility of the head during ball striking and swinging, and also aids in attaining proper head alignment to the ball. A frame mounted upon a cap visor includes spaced ends, and reference elements formed of a thin material are mounted upon the frame ends and define closed loops. The reference elements are located within the wearer's line of sight while viewing the ball to be struck, and the proximity of the reference elements to the wearer's eyes cause the closed loops to appear to define an enclosed alignment target in which the ball may be located during striking. The particular configuration of the alignment target is determined by the configuration of the reference elements' loops.

16 Claims, 1 Drawing Sheet

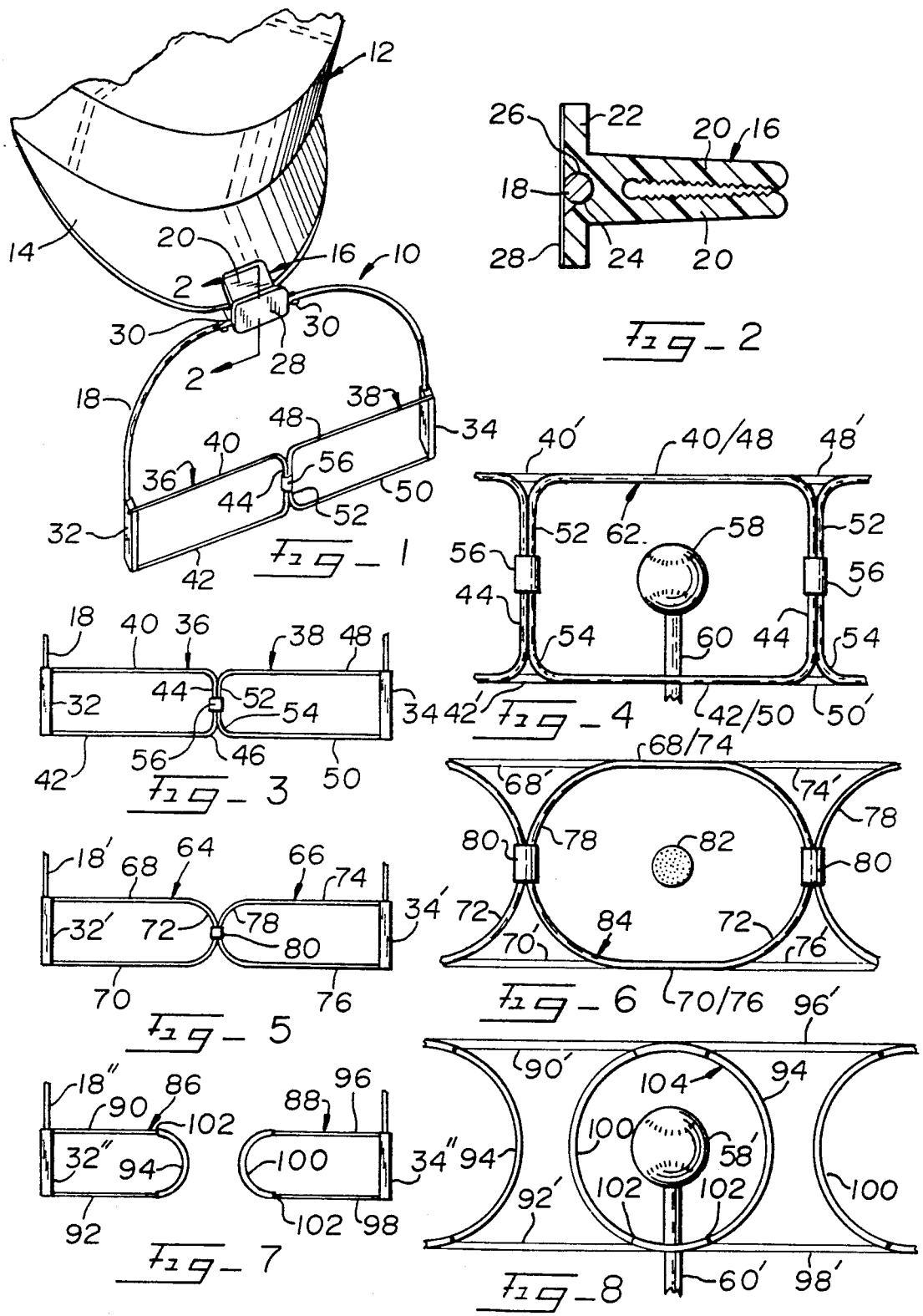

TRAINING DEVICE FOR BATTERS AND GOLFERS

BACKGROUND OF THE INVENTION

1. Field of the Invention

The invention pertains to training devices to teach head immobility while striking a stationary baseball or golf ball which are mounted upon the wearer's head and optically produce an enclosed alignment target in which the ball may be observed during striking. Movement of the head is readily observed by changes in the relationship between the ball and the alignment target.

2. Description of the Related Art

Training devices for aiding in the striking and alignment of balls, particularly golf balls, which are mounted upon the wearer's head have been previously proposed as disclosed in U.S. Pat. Nos. 1,169,188; 3,264,002; 3,437,339; and 4,531,743. Also, sighting devices to aid in the game of golf as mounted upon a wearer's head are known as disclosed in U.S. Pat. Nos. 3,729,199 and 4,696,111.

In my U.S. Pat. No. 4,762,325 I have disclosed a training device particularly suitable for golfers, but which can also be used in the striking of teed baseballs, wherein elongated reference elements mounted upon a support attached to the visor of a cap have a reference mark in the form of a small ball located centrally upon the reference element. Due to the proximity of the reference elements and marks to the viewer's eyes when addressing a golf ball the two reference marks appear to comprise four rectangularly related marks which visually define a "box" which may be centered with respect to the ball prior to being struck. The length of the reference elements aids in the orientation of the wearer's head to the desired direction of movement of the ball, and movement of the head prior to striking of the ball can be ascertained by noting relative movement of the reference elements and marks to the ball due to head movement. The training device of this patent does not disclose a "closed" alignment target, and it is desirable to improve the nature and configuration of the alignment target or area in order to simplify use of this type of training device, render use of the training device easier for the unskilled, and reduce the likelihood of misconstruing the relationship of the target configuration and the ball to be struck.

SUMMARY OF THE INVENTION

It is an object of the invention to provide a training device for use in the striking of stationary balls which visually produces an enclosed alignment target in which the ball may be viewed and oriented to discourage head movement.

Another object of the invention is to provide a training device for discouraging head movement during ball striking, and which aids in the alignment of the wearer's head to the ball during striking.

Yet another object of the invention is to provide a training device for striking a stationary ball wherein a frame is mounted upon the wearer's head and includes reference elements of such configuration as to define closed loops whereby viewing of the ball through the reference elements produces the appearance of an enclosed alignment target in which the ball may be centered and maintained during the swing and striking, and head movement may be readily observed and corrected.

In the practice of the invention, a lightweight frame is adapted to be attached to the visor of a cap worn by the user. The frame is preferably pivotally attached to the cap visor, and may be pivoted between a non-use position above the wearer's line of sight, or a use position within the wearer's line of sight when addressing a stationary ball, such as a teed baseball or a golf ball.

The frame is in the form of a lightweight bow having ends which are spaced apart and are located on opposite sides of the wearer's line of sight when addressing the ball to be struck, and are peripherally visible. A lightweight thin reference element is mounted upon each frame end and extends toward the opposite frame end. The reference elements are identical mirror images of each other, and each reference element consists of a pair of parallel vertically spaced members wherein the outer ends thereof are interconnected by a loop. Accordingly, each reference element comprises a closed loop configuration.

The length of the reference elements may be one-half of the distance separating the frame ends wherein the closed loops of the two reference elements engage, and may be interconnected by a connector. Preferably, the connector relatively conforms to the configuration of the loops, and is of a contrasting color with respect to the color of the reference elements.

In an embodiment of the invention, the reference elements' loops do not engage, but are in a spaced relationship to each other, although horizontally aligned.

Because the frame and reference elements are relatively close to the eyes of the wearer, for instance approximately seven inches, the viewing of a ball through the reference elements produces a "double vision" of the reference elements and the closed loops of the reference elements appear to visually define an enclosed box or alignment target in which the ball to be struck may be readily viewed and centered. Accordingly, the centering of the ball within the optical alignment target formed by the closed loops permits any head movement relative to the ball to be readily observed as head movement causes the optical target to move relative to the stationary ball. The user is thereby very conscious of head movement and may concentrate on holding the head stationary while viewing the ball during the swing and striking of the baseball bat or golf club.

By varying the configuration of the reference elements' closed loops, the configuration of the alignment target will vary. For instance, if the closed loops are of a "squared" configuration, the alignment target will be of a substantially rectangular shape. If the closed loops are of a semi-circular configuration, and are connected, the alignment target will be of an oval shape. In the embodiment where the closed loops are not connected, and are of a semi-circular configuration, the alignment target will be of a circular form.

As the reference elements include horizontal and spaced elongated linear members these members may be used for alignment purposes, and the visual image produced by the reference elements, in addition to encouraging immobility of the head during ball striking, will also aid the wearer in properly aligning the head during the addressing of the ball and striking.

BRIEF DESCRIPTION OF THE DRAWINGS

The aforementioned objects and advantages of the invention will be appreciated from the following description and accompanying drawings wherein:

FIG. 1 is a perspective view of a training device in accord with the invention as attached to the visor of a cap, FIG. 2 is an elevational sectional view taken through the training device mounting clip along Section 2—2 of FIG. 1, FIG. 3 is a front elevational detail view of an embodiment of the invention utilizing a "squared" closed loop, FIG. 4 is an enlarged detail view of the visual image produced by the embodiment of FIG. 3 when viewing a teed baseball therethrough, FIG. 5 is a detail front elevational view of another embodiment of the training device illustrating interconnected semi-circular closed loop reference elements, FIG. 6 is an enlarged detail elevational view of the visual image produced by the embodiment of FIG. 5, when viewing a golf ball therethrough, FIG. 7 is a detail front elevational view of another embodiment of reference element configuration wherein the reference elements are not connected and use a semi-circular closed loop, and FIG. 8 is a detail elevational view of the visual image produced by the embodiment of FIG. 7 when viewing a teed baseball therethrough.

DESCRIPTION OF THE PREFERRED EMBODIMENTS

With reference to FIG. 1, a training device in accord with the invention is represented at 10 as mounted upon a cap 12. The cap 12 includes a visor 14, and the training device 10 includes a clip 16 wherein the device may be selectively attached to the cap visor 14. In this respect the training device of the invention is similar to the device shown in my U.S. Pat. No. 4,762,325, and the similarities of use, and structure, between the instant invention and my previously patented device will be appreciated from the patent.

The clip 16 is preferably molded of a synthetic plastic material and supports the frame 18 which is in the form of a bow. The clip 16 includes resilient fingers 20 serrated upon their inner edges whereby the fingers may be inserted upon opposite sides of the visor 14 to achieve a pinching grip upon the visor.

The clip 16 also includes an enlarged head 22 having a semi-cylindrical channel 24 defined therein of a diameter substantially equal to the diameter of the frame 18. The channel 24 circumscribes a circumference more than 180°, and is defined by the edges 26. The frame 18 may be snapped into the channel 24 past the edges 26 and will be retained therein by the edges 26 in a frictional manner wherein a pivotal support of the frame 18 within the clip 16 is achieved.

A face plate 28, which may be paper or plastic, adheres to the head 22, and may constitute a nameplate or logo, and improves the appearance of the interconnection between the clip and the frame 18.

The frame 18 may be swaged or pinched as at 30 on each lateral side of the clip head 22 to ensure that the frame 18 will remain centered upon the clip 16.

The frame 18 may be formed of wire or molded of plastic, and is preferably of the thin bowed construction as will be apparent from FIG. 1. The frame includes ends 32 and 34 which are in spaced relationship to each other, and are in the form of rectangular blocks which are fixed or integrally molded to the frame 18. The entire frame 18 and the ends 32 and 34 may comprise a single molded unit of synthetic plastic, and it is to be understood that a variety of manufacturing techniques may be used to manufacture the frame 18 and its enlarged ends 32 and 34.

The reference elements 36 and 38 are mounted upon the frame ends 32 and 34, respectively. These reference elements are formed of a thin stiff filament or wire having inner ends which are attached to their respective frame ends. The reference element 36 includes an upper member 40 and a lower member 42, these members are substantially parallel, and during use of the training device will be substantially horizontally disposed. The outer ends of the members 40 and 42 are interconnected to define a loop 44, and the loop 44 is connected to the members 40 and 42 at the transitional corners 46 which are of a relatively small radius wherein the loop 44 is substantially perpendicularly disposed to the members 40 and 42.

The reference element 38 is formed by the members 48 and 50 which are interconnected at their ends by the loop 52 through the sharp corners 54. In the embodiment of FIG. 3, the loops 44 and 52 are interconnected by a connector 56 which may be in the form of a tape having several turns about the loops 44 and 52.

Preferably, to aid in the visual observation and awareness of the training device the reference members 36 and 38 are of a bright white color, while the connector 56 is of a contrasting color, such as a fluorescent red or orange.

In the use of the training device as shown in FIGS. 1-4, the cap 12 is placed upon the head of the user, and the visor 14 is centrally located with respect to the head and eyes, i.e. the cap 12 is placed upon the wearer's head in the normal manner, but care is taken to locate the hat symmetrically upon the head. Thereupon, the frame 18 is pivoted within the clip channel 24 so as to position the reference elements 36 and 38 in front of the user's eyes, and the spacing between the reference elements and the user's eyes will be approximately seven inches. The reference elements' members 40, 42, 48 and 50 lie in the same plane, and, in most cases, the direction of observation of the user to the ball being struck will be substantially perpendicular to this plane.

Because of the proximity of the reference elements 36 and 38 to the user's eyes upon the user focusing upon the ball which is to be struck, which will be several feet beyond the training device 10, the spacing of the eyes produces a "double vision" image of the reference elements similar to that shown in FIG. 4.

In FIG. 4 a baseball 58 is illustrated as resting upon a tee 60 and the training device is being used to teach the user to maintain the head immobile while striking the ball 58 with a baseball bat from the tee 60. As the eyes of the user focus on the ball 58 the user is conscious of the image as shown in FIG. 4 wherein the reference element members, loops and connector appear twice as indicated by the reference numerals of FIG. 4. Centrally, within the user's vision, a box or alignment target 62 of a rectangular configuration appears as defined by the members 40/48 and 42/50, and loops 44 and 52. Two connectors 56 will appear to exist, and the contrasting color between the connectors 56 and the members and loops further aids in defining the target 62, and the user can readily "center" the baseball 58 within the target 62, and any movement of the head will cause the enclosed target box 62 to move relative to the ball 58 indicating to the user that the head is not being held stationary. Significant concentration on the part of the wearer is required to maintain the ball 58 centered within the target 62.

With respect to FIG. 4, the sections 40', 42', 48' and 50' will not appear as visible as the target sides 40/48, 42/50, 44 and 52 due to the optical characteristics and the lack of a plural overlay of reference element members. However, the user is conscious of the substantially horizontal orientation of the upper and lower edges of the target 62, and this consciousness aids in the alignment of the head with the horizontal during ball striking.

During use, the user will visually focus upon the ball 58, position the head such that the ball 58 is centered within the alignment target 62, and endeavor to maintain this relationship between the ball and the alignment target during the entire swing, and even after the ball is struck the head should momentarily retain this position.

With respect to the embodiment shown in FIGS. 1, 3 and 4, the fact that the loop corners 46 and 52 are relatively small or sharp will cause the alignment target 62 to have the generally rectangular configuration apparent from FIG. 4.

FIGS. 5 and 6 illustrate a variation in the configuration of the reference elements which produces a generally oval alignment target. In this embodiment, the reference elements 64 and 66 are mounted upon the ends 32' and 34' of the frame 18'. The reference element 64 includes the upper member 68 and the lower member 70 whose outer ends are interconnected by the semi-circular loop 72. Likewise, the reference element 66 is formed by the upper member 74 and the lower parallel member 76 and the outer ends are interconnected by the semi-circular loop 78. The loops 72 and 78 are interconnected by the connector 80 which may be a brightly colored tape, and preferably, the reference elements 64 and 66 are of a bright white color.

FIG. 6 illustrates the visual image produced by the reference elements of FIG. 5. As previously described, the proximity of the elements 64 and 66 to the eyes produces a double image, and when viewing a golf ball with the embodiment of FIGS. 5 and 6 the golf ball 82 may be centered within the box or alignment target 84 which is defined by the members 68/74 and 70/76, and loops 72 and 78. The member portions 68', 70', 74' and 76' will not be of the same intensity as the target sides 68/74 and 70/76, and the oblong configuration of the alignment target 84 will be readily apparent to the viewer observing the golf ball 82.

During use, the golf ball 82 will be centered within the target 84 and the user will endeavor to maintain the head immobile during the swing and impact of the golf club with the ball 82, and the user should endeavor to maintain eye focus on the spot where the golf ball was located even after impact in order to prevent premature lifting of the head.

In the embodiment of FIGS. 7 and 8, the reference elements 86 and 88 are not interconnected by a connector such as the embodiments of FIGS. 3 and 4, and FIGS. 5 and 6. The reference element 86 includes the upper member 90, lower member 92 and semi-circular loop 94 interconnecting the outer ends of the members. Similarly, reference element 88 includes upper member 96, lower member 98, and the semi-circular loop 100. Preferably, the loops 94 and 100 are colored with a bright contrasting color with respect to the associated elongated horizontal members, the color transition line being illustrated at 102.

The spacing between the reference elements 86 and 88 is such that upon the user viewing a baseball 58' resting upon the tee 60' the alignment target 104 will be substantially circular. As in the previous embodiments, the components of the training device within the line of sight of the user will appear as a double vision, but because of the spacing of the loops 94 and 100 the target 104 will be approximately a circle, rather than the oval which appears in the embodiment of FIGS. 5 and 6. The member portions 90', 92', 96' and 98' will not be of as great intensity as the loops 94 and 100 as represented in FIG. 8, but these portions will be visual, and the horizontal orientation thereof will aid the user in the desired horizontal alignment of the head.

It will be appreciated that any of the above described three embodiments may be used with either the training of striking of baseballs or golf balls. In either instance, as with the striking of any ball, the head should be immobilized in order to produce consistency, and as the various embodiments of the invention produce a visual image of an enclosed alignment target the ball to be struck may be readily visually centered within the alignment target and any movement of the head so as to displace the target with respect to the ball may be immediately discerned, and the head movement corrected.

After use, the frame 10 may be pivoted upwardly within the clip channel 24 to remove the frame and reference elements from the line of sight of the user, and it will be readily appreciated that the training device of the invention is economical to manufacture, and easily used by persons of limited skill.

It is appreciated that various modifications to the inventive concepts may be apparent to those skilled in the art without departing from the spirit and scope of the invention.

I claim:

1. A training device for encouraging immobility and proper alignment of the head while striking a ball comprising, in combination, a frame having spaced ends, mounting means connected to the frame for mounting the frame upon the head within the wearer's line of sight when addressing the ball to be struck, a reference element mounted upon each frame end, each reference element comprising a pair of spaced substantially parallel thin first and second members extending toward the other frame end each having an outer end, the outer ends of said first and second members associated with a common frame end being interconnected whereby said reference elements each define a closed loop, said reference elements being substantially identical and in opposed alignment with respect to each other whereby upon observing the ball to be struck through said reference elements said reference elements appear to define an enclosed alignment target in which the ball to be struck will appear and be maintained therein during striking of the ball upon the wearer's head being properly aligned with the ball and substantially immobilized.

2. In a training device as in claim 1, said reference elements' loops being of a substantially squared configuration whereby said alignment target is of a rectangular configuration.

3. In a training device as in claim 1, said reference elements' loops being of a semi-circular configuration.

4. In a training device as in claim 3, said loops of said reference elements being interconnected whereby said target is of an oval configuration.

5. In a training device as in claim 3, said loops of said reference elements being spaced apart a distance which will produce a target having a substantially circular configuration.

6. In a training device as in claim 2, said loops of said reference elements being interconnected.

7. In a training device as in claim 6, said loops being interconnected by a connector having a color contrasting with the color of said reference elements.

8. In a training device as in claim 4, said loops being interconnected by a connector having a color contrasting with the color of said reference elements.

9. A training device for encouraging immobility and proper alignment of the head while striking a ball comprising, in combination, a frame having spaced ends, mounting means connected to the frame for mounting the frame upon the head within the wearer's line of sight when addressing the ball to be struck, a reference element mounted upon each frame end, each reference element being formed of a thin member and having an outer end defining a closed loop, said reference elements being substantially identical and in opposed alignment with respect to each other whereby upon observing the ball to be struck through said reference elements said reference elements appear to define an enclosed alignment target in which the ball to be struck will appear and be maintained therein during striking of the ball upon the wearer's head being properly aligned with the ball and substantially immobilized.

10. In a training device as in claim 9, said reference elements' loops being of a substantially squared configuration whereby said alignment target is of a rectangular configuration.

11. In a training device as in claim 9, said reference elements' loops being of a semi-circular configuration.

12. In a training device as in claim 11, said loops of said reference elements being interconnected whereby said target is of an oval configuration.

13. In a training device as in claim 11, said loops of said reference elements being spaced apart a distance which will produce a target having a substantially circular configuration.

14. In a training device as in claim 10, said loops of said reference elements being interconnected.

15. In a training device as in claim 14, said loops being interconnected by a connector having a color contrasting with the color of said reference elements.

16. In a training device as in claim 12, said loops being interconnected by a connector having a color contrasting with the color of said reference elements.

* * * * *